US009397837B2

(12) United States Patent
Talwerdi et al.

(10) Patent No.: US 9,397,837 B2
(45) Date of Patent: Jul. 19, 2016

(54) SECURE ACCESS TO INFORMATION ASSOCIATED WITH A VALUE ITEM

(75) Inventors: Mehdi Talwerdi, North Vancouver (CA); Marcus Klische, Dorfen (DE)

(73) Assignee: SICPA HOLDING SA, Prilly (CH)

( * ) Notice: Subject to any disclaimer, the term of this patent is extended or adjusted under 35 U.S.C. 154(b) by 993 days.

(21) Appl. No.: 12/159,720

(22) PCT Filed: Jan. 5, 2007

(86) PCT No.: PCT/CA2007/000016
§ 371 (c)(1),
(2), (4) Date: Jun. 30, 2008

(87) PCT Pub. No.: WO2007/076610
PCT Pub. Date: Jul. 12, 2007

(65) Prior Publication Data
US 2009/0007258 A1    Jan. 1, 2009

Related U.S. Application Data

(60) Provisional application No. 60/757,162, filed on Jan. 6, 2006.

(51) Int. Cl.
| | | |
|---|---|---|
| G06F 15/16 | (2006.01) |
| H04L 9/32 | (2006.01) |
| B42D 25/305 | (2014.01) |
| B42D 25/369 | (2014.01) |
| B42D 25/346 | (2014.01) |

(52) U.S. Cl.
CPC ............ *H04L 9/3247* (2013.01); *B42D 25/305* (2014.10); *B42D 25/346* (2014.10); *B42D 25/369* (2014.10); *B42D 2035/16* (2013.01); *B42D 2035/24* (2013.01); *B42D 2035/34* (2013.01); *H04L 2209/805* (2013.01)

(58) Field of Classification Search
CPC ............ H04L 9/3247; H04L 2209/805; B42D 2035/16; B42D 2035/24; B42D 2035/34; B42D 25/305; B42D 25/346; B42D 25/369
See application file for complete search history.

(56) References Cited

U.S. PATENT DOCUMENTS

| | | | | | |
|---|---|---|---|---|---|
| 4,066,910 | A | * | 1/1978 | Swift | B42D 25/00 235/454 |
| 4,618,167 | A | * | 10/1986 | Whitehead | D02G 3/12 283/57 |
| 5,131,038 | A | * | 7/1992 | Puhl et al. | 340/5.61 |
| 5,138,649 | A | * | 8/1992 | Krisbergh et al. | 455/420 |
| 5,319,705 | A | * | 6/1994 | Halter et al. | 705/54 |

(Continued)

FOREIGN PATENT DOCUMENTS

WO    2006021083 A2    3/2006

*Primary Examiner* — Arvin Eskandarnia
*Assistant Examiner* — Anthony Fabbri
(74) *Attorney, Agent, or Firm* — Greenblum & Bernstein, P.L.C.

(57) ABSTRACT

Privacy of information is protected by a method of securing access to information associated with a value item, the method including comparing a security signature and a stored profile, and permitting access to the information associated with the value item if the security signature matches the stored profile. The value item may be a machine readable document or other item of high value. The associated information may be stored in an electronic storage medium attached to the value item, or may be stored in an external database, or both. Permitting access to the associated information may include generating an access code unique to the associated information and to the value item.

20 Claims, 6 Drawing Sheets

(56) References Cited

U.S. PATENT DOCUMENTS

| | | | | |
|---|---|---|---|---|
| 5,450,491 | A * | 9/1995 | McNair | 713/184 |
| 5,601,931 | A * | 2/1997 | Hoshino et al. | 428/537.5 |
| 5,767,496 | A * | 6/1998 | Swartz et al. | 235/462.1 |
| 5,884,046 | A * | 3/1999 | Antonov | 709/238 |
| 5,932,119 | A * | 8/1999 | Kaplan et al. | 219/121.68 |
| 5,984,366 | A * | 11/1999 | Priddy | 283/72 |
| 6,014,453 | A * | 1/2000 | Sonoda et al. | 382/137 |
| 6,042,150 | A * | 3/2000 | Daley | A63F 1/00 250/271 |
| 6,068,301 | A * | 5/2000 | Han et al. | 283/82 |
| 6,189,008 | B1 * | 2/2001 | Easty et al. | |
| 6,213,391 | B1 * | 4/2001 | Lewis | G06Q 20/341 235/380 |
| 6,263,090 | B1 * | 7/2001 | Scott et al. | 382/124 |
| 6,298,336 | B1 * | 10/2001 | Davis | G06Q 20/105 705/41 |
| 6,351,771 | B1 * | 2/2002 | Craddock et al. | 709/227 |
| 6,385,596 | B1 * | 5/2002 | Wiser et al. | 705/51 |
| 6,571,221 | B1 * | 5/2003 | Stewart et al. | 705/52 |
| 6,574,609 | B1 * | 6/2003 | Downs et al. | 705/50 |
| 6,741,991 | B2 | 5/2004 | Saito | |
| 6,880,054 | B2 * | 4/2005 | Cheng et al. | 711/164 |
| 6,944,600 | B2 * | 9/2005 | Stefik et al. | 705/57 |
| 7,162,035 | B1 * | 1/2007 | Durst et al. | 380/54 |
| 7,170,391 | B2 * | 1/2007 | Lane | G06K 19/025 340/10.5 |
| 7,206,847 | B1 * | 4/2007 | Alberth et al. | 709/229 |
| 7,221,258 | B2 * | 5/2007 | Lane | G06K 19/025 340/10.1 |
| 7,234,645 | B2 * | 6/2007 | Silverbrook | B41J 2/14 235/454 |
| 7,283,630 | B1 * | 10/2007 | Doljack | 380/55 |
| 7,639,837 | B2 * | 12/2009 | Carr et al. | 382/100 |
| 7,640,186 | B1 * | 12/2009 | Fraser et al. | 705/26.35 |
| 8,109,436 | B1 * | 2/2012 | Hopkins, III | 235/380 |
| 8,922,791 | B2 * | 12/2014 | Silverbrook | B41J 2/14 348/207.2 |
| 2001/0012136 | A1 * | 8/2001 | Kurosawa | 358/487 |
| 2001/0051996 | A1 * | 12/2001 | Cooper et al. | 709/217 |
| 2002/0061120 | A1 * | 5/2002 | Carr et al. | 382/100 |
| 2002/0142764 | A1 * | 10/2002 | Newell et al. | 455/419 |
| 2002/0194476 | A1 * | 12/2002 | Lewis et al. | 713/169 |
| 2003/0025739 | A1 * | 2/2003 | Yamagishi et al. | 346/83 |
| 2003/0057274 | A1 * | 3/2003 | Dawson | 235/380 |
| 2003/0089764 | A1 * | 5/2003 | Meadow et al. | 235/375 |
| 2003/0117262 | A1 * | 6/2003 | Anderegg et al. | 340/5.53 |
| 2003/0120925 | A1 * | 6/2003 | Rose et al. | 713/176 |
| 2003/0120928 | A1 * | 6/2003 | Cato et al. | 713/176 |
| 2004/0049687 | A1 * | 3/2004 | Orsini et al. | 713/189 |
| 2004/0111625 | A1 * | 6/2004 | Duffy | G06K 9/00087 713/186 |
| 2004/0112962 | A1 * | 6/2004 | Farrall et al. | 235/462.01 |
| 2004/0167984 | A1 * | 8/2004 | Herrmann | 709/229 |
| 2005/0093868 | A1 * | 5/2005 | Hinckley | 345/502 |
| 2005/0125681 | A1 * | 6/2005 | Bressy | G06F 21/71 713/189 |
| 2005/0132227 | A1 * | 6/2005 | Reasor et al. | 713/201 |
| 2005/0195975 | A1 * | 9/2005 | Kawakita | 380/30 |
| 2005/0251491 | A1 * | 11/2005 | Medina et al. | 705/71 |
| 2006/0054679 | A1 * | 3/2006 | Ruping | 235/375 |
| 2006/0287964 | A1 * | 12/2006 | Brown | 705/64 |
| 2007/0056041 | A1 * | 3/2007 | Goodman | H04L 9/3247 726/26 |
| 2007/0108268 | A1 * | 5/2007 | Graves et al. | 235/380 |
| 2007/0150416 | A1 * | 6/2007 | Friedman | 705/57 |
| 2007/0198832 | A1 * | 8/2007 | Novack et al. | 713/158 |
| 2007/0257481 | A1 * | 11/2007 | Schwenk | B42D 25/29 283/72 |
| 2007/0273141 | A1 * | 11/2007 | Schwenk | B41M 3/144 283/72 |
| 2007/0278285 | A1 * | 12/2007 | Ehrensvaerd | G06Q 10/08 235/375 |
| 2008/0105751 | A1 * | 5/2008 | Landau | 235/492 |
| 2009/0008924 | A1 * | 1/2009 | Ophey et al. | 283/85 |
| 2009/0159669 | A1 * | 6/2009 | Mullen et al. | 235/380 |
| 2009/0169018 | A1 * | 7/2009 | Deisher | 380/278 |

\* cited by examiner

SECURE ACCESS TO INFORMATION ASSOCIATED WITH A VALUE ITEM

FIELD OF THE INVENTION

This invention relates to the protection of information and privacy and, in particular, a method of securing access to information associated with a value item.

DESCRIPTION OF RELATED ART

The protection of information and privacy is of paramount importance in the use of a document, such as a machine readable passport or smart card, having attached to it an electronic processor and an electronic storage medium that is capable of storing data representing information associated with the document.

Access to the data stored in the electronic storage medium of the document may be restricted by including on the surface of the document a bar code optically readable by a machine that detects the dimensions of individual bars in the bar code. The detected dimensions are used to generate a code that provides access to the stored data. However, the use of a bar code is insecure because the code can be generated by optically reading a mere photocopy of the document, thereby providing access to the stored data without optically reading the document itself.

Data encryption techniques may be used to prevent unauthorized access to secure data. However, such encryption techniques cannot fully protect the encrypted data in circumstances where access to a decryption key for decrypting the encrypted data is not adequately secured.

Thus, there is a need in the art for an improved method of securing access to information associated with a document or other item of value, including information represented by encrypted or unencrypted data stored in an electronic storage medium.

SUMMARY

The shortcomings described above can be addressed by providing a method of securing access to information associated with a value item, the method including comparing a security signature and a stored profile, and permitting access to the information associated with the value item if the security signature matches the stored profile.

Further features of the present invention will be understood in view of the detailed description of embodiments of the invention and the accompanying drawings.

DRAWINGS

In drawings which illustrate specific embodiments of the invention,

DETAILED DESCRIPTION OF EMBODIMENTS OF THE INVENTION

A method of securing access to information associated with a value item is provided. The method includes comparing a security signature and a stored profile, and permitting access to the information associated with the value item if the security signature matches the stored profile.

Referring to FIGS. 1 to 10, the value item 100 may be a government-issued or other official document such as a passport, visa, driver's license card or identification card; a financial document such as a check, credit card, debit card, stock certificate, money order or bank note; or any other item of high value such as a painting or its associated certificate or other documentation. The value item 100 may be a machine readable passport, an e-passport or other machine readable travel document. The value item 100 may be in compliance with an industry standard such as a standard of the International Civil Aviation Organization (ICAO) or a standard of the International Organization for Standardization (ISO).

The information associated with the value item 100 may include information identifying an individual such as a digital representation of a hand-written signature, information identifying a position, role or title, of an individual, information identifying an organization, a value estimation, time or date information, an address or other information identifying a geographical location, and information identifying a value item type. The information associated with the value item 100 may be updated from time to time, provided access to the associated information is permitted.

Figure 1:
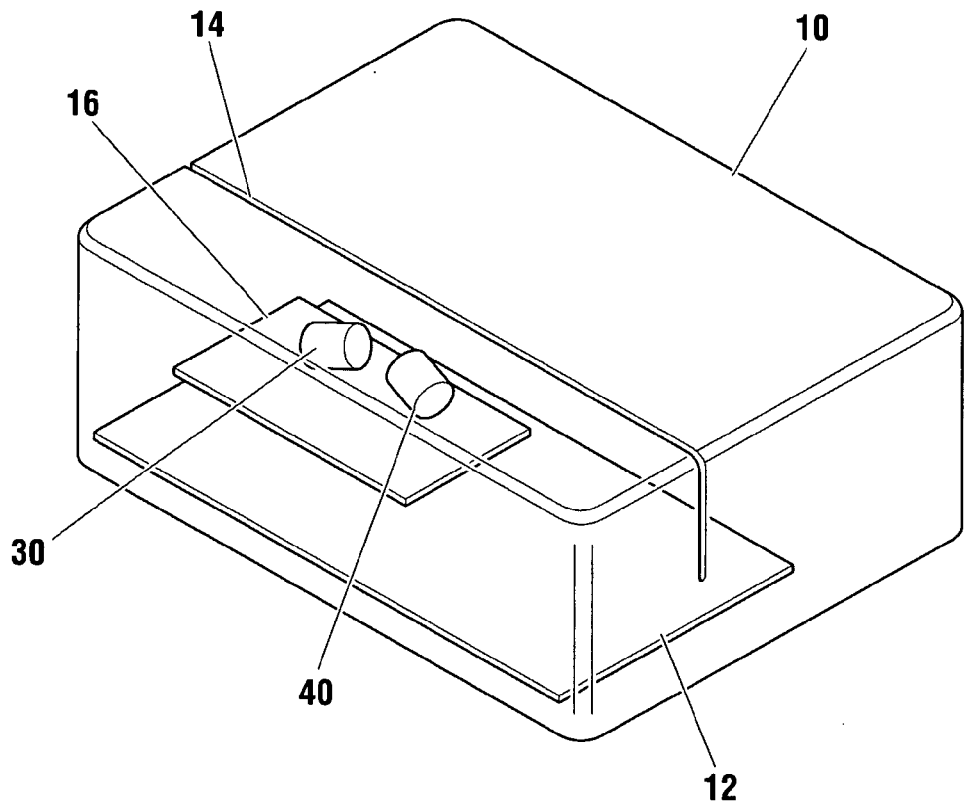
FIG. 1 is a perspective view of a scanner in accordance with the preferred embodiment of the invention.

FIG. 1 is a perspective view of a terminal unit or scanner 10 in accordance with the preferred embodiment of the invention. The scanner 10 is an electronic device incorporating a radiating stimulus or source 30 and a sensor 40. The scanner 10 includes a main circuit board 12 housing a main circuit for controlling activities of the scanner 10, a track 14 to align and hold a value item 100, which may be a document, in position to pass in front of the source 30 and the sensor 40, and a sensor circuit board 16 to which the sensor 40 is electrically connected. The scanner 10 may be operable to scan one or more value items 100 simultaneously.

Figure 2:
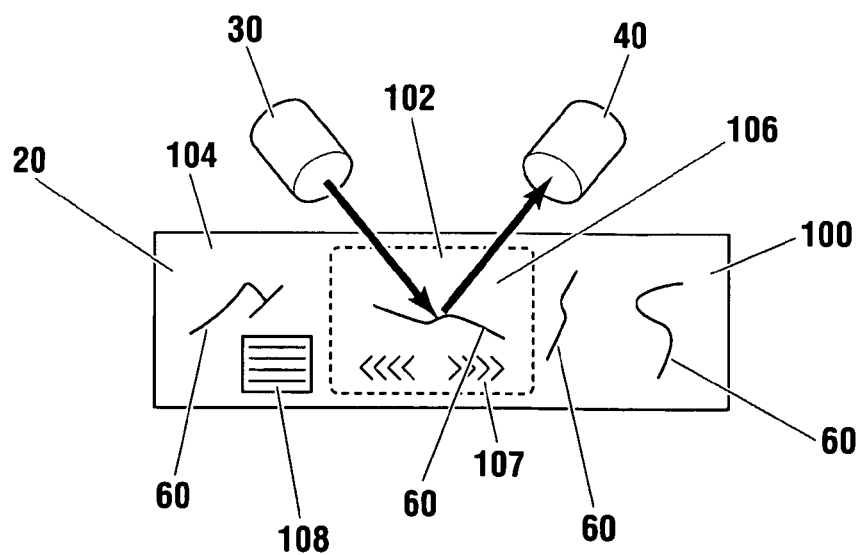
FIG. 2 is a perspective view of a source and a sensor of the scanner shown in FIG. 1, shown on the same side of a substrate according to the invention.

Referring to FIGS. 1 and 2, the scanner 10 may be operable to detect one or more boundaries of the value item 100, including detecting one or more boundaries of an outer surface area of the value item 100, and may be operable to scan areas defined by such one or more boundaries. Multiple portions of the value item 100 may be scanned sequentially or simultaneously, and the protection of information and privacy is typically enhanced by increasing the size of the portion or portions of the value item 100 being scanned. In an embodiment of the invention, the scanner 10 is operable to scan within one or more portions of the substrate 20, including possibly within a first portion 102, within a second portion 104, or within both the first and second portions 102 and 104. In the exemplary embodiment shown in FIG. 1, the first portion 102 is a machine readable zone 106 for displaying information readable by a machine, including being readable by a machine employing optical character recognition techniques, and the second portion 104 consists of the remainder of the side of the value item 100 shown in FIG. 1. The information displayed in the machine readable zone 106 may be alphanumeric characters, geometric shapes, symbols, including graphical symbols, or other markings such as the markings 107 shown in FIG. 2. The markings 107 preferably conform to an industry standard, but need not.

The value item 100 may have an electronic storage medium 108 associated with it for storing the associated information. The electronic storage medium 108 is preferably attached to the value item 100, and may be embedded within the value item 100, surface mounted to the outer surface of the value item 100, or partially embedded within the value item 100 near its outer surface. The electronic storage medium 108 may include a magnetic stripe, an integrated circuit with contacts, a contactless integrated circuit, an optical storage unit, a bar code, and any combination thereof. The electronic storage medium 108 may include a microprocessor, microcontroller, a read-only memory, programmable read-only memory, erasable programmable read-only memory, electrically erasable programmable read-only memory, flash type memory, or any combination thereof, for example. The electronic storage medium 108 may be operable to store data in accordance with industry standards such as the Logical Data Structure (LDS) standard.

The source 30 produces a stimulus which may be electromagnetic radiation in a range of wavelengths of the electromagnetic spectrum, including ultra-violet radiation, visible light radiation, infra-red radiation, and any combination thereof. The source 30 preferably produces electromagnetic radiation having a wavelength within the range of 200 nm to 1100 nm, and may include a light-emitting diode, which may be of an energizing type. In alternative embodiments of the invention, the source 30 produces heat energy, laser or cold laser beams, radio waves, or any other suitable stimulus, including magnetic field stimuli for detection by any one or more of magnetic ink readers, magnetic credit card readers, or magnetic strip readers.

The sensor 40 is preferably capable of sensing the stimulus produced by the source 30, including electromagnetic radiation having a wavelength in the range of 200 nm to 1100 nm or any sub-range thereof. The sensor 40 may include a photodiode, and may additionally include a filter for limiting the range of wavelengths sensed by the photodiode. In alternative embodiments of the present invention, the sensor 40 may form part of any one or more of a magnetic ink reader, magnetic credit card reader or magnetic strip reader, for example.

FIG. 2 shows electromagnetic radiation being emitted from the source 30 toward a value item 100, reflecting off the surface of the value item 100, which may be at, near or distal from a security feature 60, and being sensed by the sensor 40 to produce a sensor 40 output.

Referring to FIGS. 1 and 2, the scanner 10 functions for a range of substrates 20 materials including paper, wood, metal, cloth, glass, fiberglass, plastic or any solid material that can be painted, printed, documented, or blended with one or more security features 60 during or after manufacturing of the substrate 20. The substrate 20 may be transparent, translucent, or opaque, and may carry a protective shield. The substrate 20 may be made of a material having naturally occurring and randomly distributed machine readable features. The present invention is not limited to value items 100, machine readable zones 106 or substrates 20 of any particular size.

Figure 3:
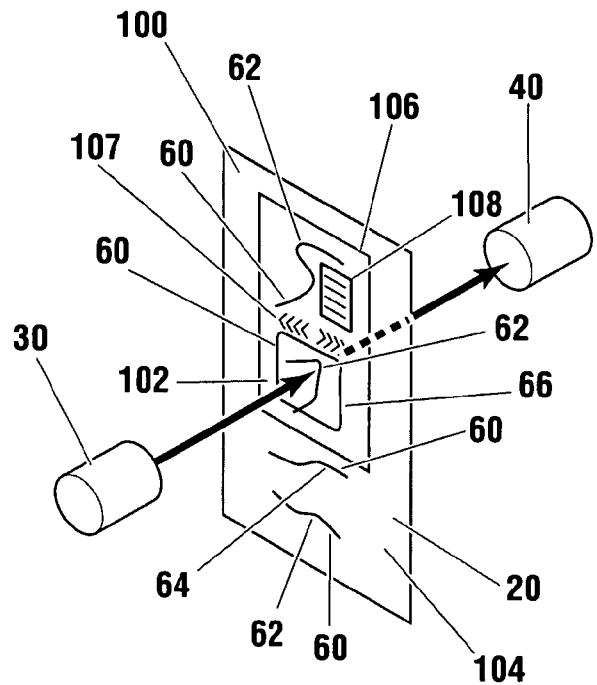
FIG. 3 is a perspective view of a source and a sensor of a modified version of the scanner shown in FIG. 1, shown on opposite sides of the substrate shown in FIG. 2.

FIG. 3 shows one embodiment of the invention that is an alternative to the embodiment shown in FIG. 2. In FIG. 3, the source 30 produces a stimulus that is directed toward the value item 100 and strikes the surface of the substrate 20, passes through the substrate 20, and is sensed by the sensor 40 located on the side of the value item 100 opposite the source 30.

Examples of security features 60 include security fibers 62 having a single color or multiple colors, security fibers 62 having a single or multiple fluorescent colors, security fibers 62 having a non-fluorescent color, and any combination thereof. The security feature 60 may be a security ink 64 having a single color or multiple colors, a security ink 64 having a single or multiple fluorescent colors, a security ink 64 having a non-fluorescent color, and any combination thereof, for example. As a further example, the security feature 60 may be a planchette 66. A metal or heat sensitive security fiber 62 may produce a response detectable by the sensor 40 in response to a heat stimulus from the source 30. A fluorescing security feature 60 may produce visible light in response to ultra-violet radiation emitted from the source 30. In some embodiments of the invention, the sensor 40 may be operable to sense a security feature 60 under ambient lighting conditions, and some security features 60 need not be illuminated by any source 30 in order to be sensed by the sensor 40. Some security features 60 are visible to the human eye in ambient light conditions or under illumination from the source 30. A security fiber 62 may fluoresce with a specific color, including fluorescing with a color in the visible light range selected to identify a particular individual, organization, or type of value item 100.

By way of further examples, the security feature 60 may be inherent to the substrate 20, such as in the case of natural imperfections occurring incidentally as a result of manufacturing the substrate 20, or be deliberately introduced to the substrate 20. The security feature 60 may be applied to the substrate 20 before, during or after the manufacturing of the substrate 20. A security feature 60 may be applied before manufacturing the substrate 20 by blending the security feature 60 into a raw material from which the substrate 20 is then manufactured. The security feature 60 may be added to the outer surface, or a portion thereof, of the substrate 20 or, additionally or alternatively, be embedded at a depth within the substrate 20. The security feature 60 may be distributed randomly on or within the substrate 20, whether inherently resulting from the manufacturing of the substrate 20 or deliberately arranged in a random distribution.

Figure 4:
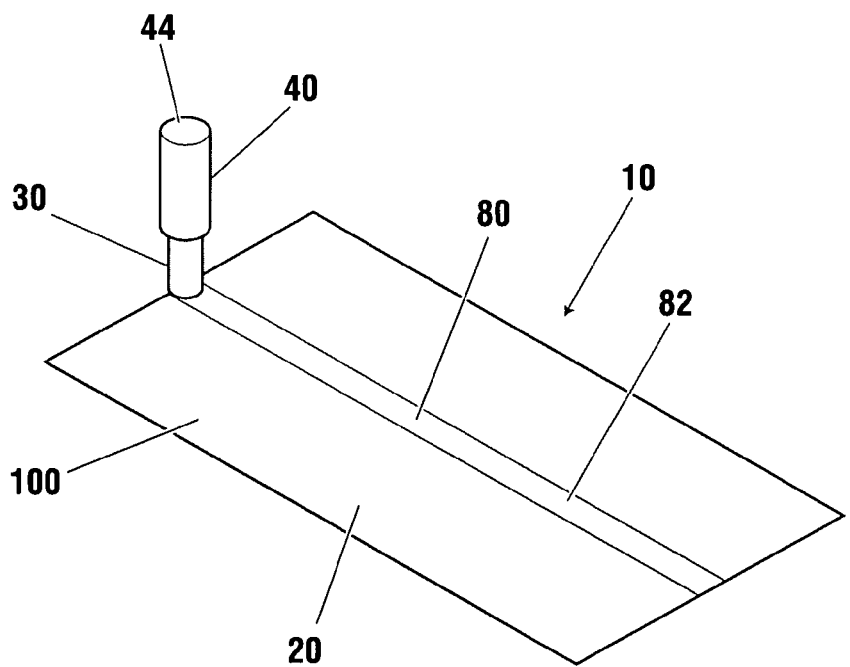
FIG. 4 is a perspective view of the substrate shown in FIG. 2, showing a narrow scanning path.

FIG. 4 shows the scanner 10 in accordance with one embodiment of the invention, in which the source 30 is a narrow beam single source 30 which produces stimuli along a scanning path 80 of the substrate 20 of the value item 100. In the embodiment of FIG. 4, the scanning path 80 is a narrow scanning path 82 and the sensor 40 is an infra-red sensor 44. The scanner 10 may traverse the narrow scanning path 82 by causing the source 30 to move, including possibly tilt, with respect to the substrate 20, causing the sensor 40 to move, including possibly tilt, with respect to the substrate 20, causing both the source 30 and the sensor 40 to move, including possibly tilt, with respect to the substrate 20, causing the substrate 20 to move, including possibly slide, with respect to the source 30, the sensor 40 or both the source 30 and the sensor 40, or by any combination thereof.

Figure 5:
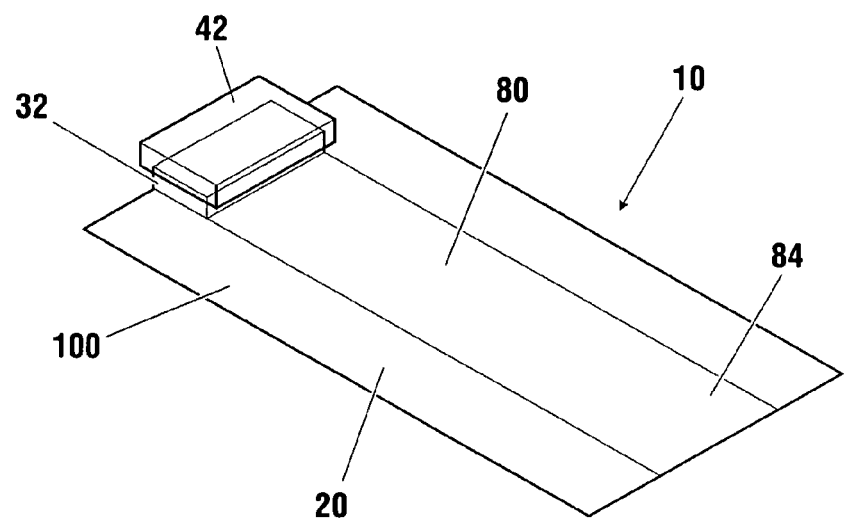
FIG. 5 is a perspective view of the substrate shown in FIG. 2, showing a source matrix and a sensor matrix in accordance with one embodiment of the invention.

FIG. 5 shows the scanner 10 in accordance with one embodiment of the invention that is an alternative to the embodiment shown in FIG. 4. As shown in FIG. 5, a source matrix 32 of the sources 30 produces stimuli along the scanning path 80, which is a wide scanning path 84, of the substrate 20 of the value item 100, and a sensor matrix 42 of the sensors 40 senses stimuli along the wide scanning path 84. The scanner 10 may traverse the wide scanning path 84 in a manner similar to that described above in regard to the narrow scanning path 82. The sources 30 of the source matrix 32 may all produce the same stimuli or produce different stimuli. For example, some sources 30 of the source matrix 32 may produce ultra-violet radiation and other sources 30 may produce infra-red radiation. The sensors 40 of the sensor matrix 42 may be of similar or different types, and each type of sensor 40 is typically in accordance with a corresponding type of source 30. The types of sources 30 and types of sensors 40 are selected to be suitable for the type or types of security features 60 employed.

The sources 30 of the source matrix 32 and the sensors 40 of the sensor matrix 42 may be arranged generally in a plurality of rows forming columns of sources 30 and sensors 40, respectively. The source matrix 32 may in some embodiments include only one row of sources 30, thereby forming an array of sources 30. Similarly, the sensor matrix 42 may in some embodiments include only one row of sensors 40, thereby forming an array of sensors 40. The arrays of sources 30 and sensors 40 may respectively be aligned longitudinally, transversely or angularly, including diagonally, to the longitudinal axis of the wide scanning path 84. Other non-rectangular arrangements of the sources 30 and the sensors 40 in the source matrix 30 and the sensor matrix 40, respectively, are within the scope of the present invention.

The scanning path 80 may be oriented with respect to a longitudinal axis of the substrate 20, as shown in FIGS. 4 and 5. Alternatively, the scanning path 80 may be oriented transversely or angularly, including diagonally, with respect to the longitudinal axis of the substrate 20. In at least one embodiment, the scanner 10 is operable to scan diagonally with respect to a longitudinal axis of the machine readable zone 106 (FIGS. 1 and 2).

Figure 6:
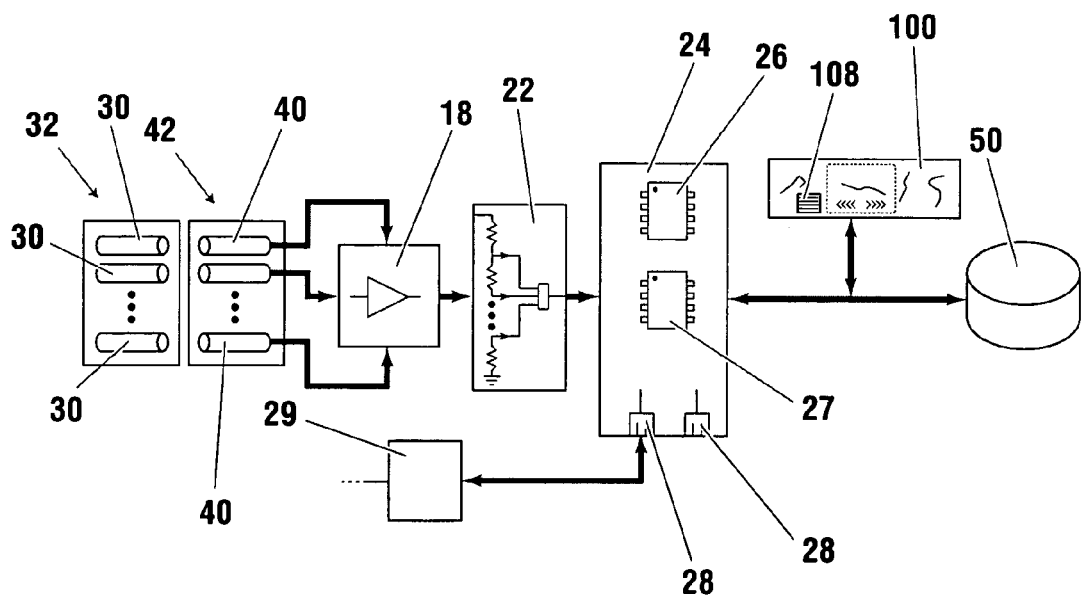
FIG. 6 is a diagram of electronic components of the scanner shown in FIG. 1.

FIG. 6 shows a schematic diagram of electronic components of the scanner 10 in accordance with one embodiment of the invention. Referring to FIG. 6, each sensor 40 output is preferably an analog electrical signal having properties which are analogous to the sensed stimulus. Each sensor 40 output is conditioned by a conditioning electronic circuit 18, which may include an amplifier such as a low-noise amplifier and/or an automatic gain control amplifier and which may further include analog filtering, in order to produce a conditioned output. Preferably, the conditioning circuit 18 improves the signal-to-noise ratio of the analog signal. The conditioned output is digitized by an analog-to-digital converter 22 to produce a digital representation of the sensed stimulus. The digital representation is digitally processed by a processor 24.

As shown in FIG. 6, the processor 24 may include a processing circuit 26, a memory circuit 27 and one or more peripheral interfaces 28. The processing circuit 26 may include a microprocessor or micro-controller for digital processing, for example. The memory circuit 27 may include a read-only memory, programmable read-only memory, erasable programmable read-only memory, electrically erasable programmable read-only memory, flash type memory, or any combination thereof, for example. Preferably, at least one peripheral interface 28 is operable to facilitate signal transmission between the processor 24 and a motion control unit 29, which is operable to cause the traversal of the scanning path 80 (FIGS. 4 and 5). In an alternative embodiment of the invention, the motion control unit 29 detects motion of a value item 100, such as in the case of a hand-swiped value item 100. The electronic circuitry shown in FIG. 6 may be implemented to form a single monolithic integrated circuit or a plurality of electronic devices in association with a single circuit board or a plurality of circuit boards, for example.

The scanner 10 is preferably operable to control the timing of the scanning operation of the scanner 10, including controlling the timing of the scanning operation to produce the digital representation of the sensed stimulus such that it has a specified number of data points corresponding to a specified distance along the scanning path 80. The timing of the scanning operation may be controlled in accordance with specifications related to the value item 100. For example, the motion control unit 29 may include a stepper motor whose operation is coordinated with the timing of the digitization process to produce the digital representation such that it has a specific number of data points per centimeter of distance along the scanning path 80. Such specifications may relate to the machine readable zone 106 in compliance with an industry standard. For example, any or all of the size and shape of the value item 100, the size of the machine readable zone 106, the location of the machine readable zone 106 on the value item 100, the font size and font type of alphanumeric characters displayed in the machine readable zone 106, and margin sizes related to the machine readable zone 106 may be specified by an industry standard. The timing of the scanning operation, including the timing of the sensing operation of the sensor 40, the timing of the digitization process of the analog-to-digital converter 22, the timing of the operation of the motion control unit 29, or any combination thereof, may be controlled in accordance with specifications of a standard. For example, in an embodiment in which the scanner 10 is operable to scan a hand-swiped value item 100, the timing of the scanning operation may be controlled by using the sensor 40 to sense the presence of a plurality of markings 107 having a specified distance therebetween and to adjust the timing of the digitization process to achieve a desired number of data points of the digital representation.

In the preferred embodiment, digital processing of the processor 24 produces a security signature that uniquely identifies the particular value item 100 being scanned by the scanner 10. Such digital processing may include normalization, signal processing to improve a signal-to-noise ratio, concatenation, data reduction, data compression, correction processing such as age, use or other correction processing, data truncation, data encryption, and any combination thereof.

The security signature is typically implemented as a sequence of numerical values representing of one or more characteristics of one or more security features 60, or one or more portions thereof. Such characteristics may include the position or distance of the security feature 60 along the scanning path 80 (FIGS. 4 and 5); a position of the security feature 60 on the surface, or portion thereof, of the substrate 20, which may be specified by X and Y coordinates; the embedded depth in the manufactured material or substrate 20 of the security feature 60, which may be specified by a Z coordinate; the length, thickness or other indication of size, of the security feature 60 or portion thereof; the color of the security feature 60; and the shade of the security feature 60, and any combination thereof, for example.

In the preferred embodiment of the invention, the security signature is reproducibly produced such that scanning a given value item 100 multiple times, including multiple times by different scanners 10 at different locations, produces security signatures that are substantially equivalent to the extent that the value item 100 has not been defaced, adulterated or otherwise modified.

The processor 24 preferably stores the security signature in the electronic storage medium 108 of the value item 100 as a stored profile that uniquely identifies the value item 100. Additionally or alternatively, the security signature associated with a given value item 100 may be stored in an external database 50 external to the given value item 100 as a stored profile uniquely identifying the given value item 100. The external database 50 may be used as a backup or otherwise redundant storage medium for one or more security signatures produced in accordance with the present invention. In the preferred embodiment, the attachment of the electronic storage medium 108 to the value item 100 permits mobile secure access to the associated information, and permits secure access in circumstances in which storing the security signature in the external database 50 or retrieving the security signature from the external database 50.

Figure 7:
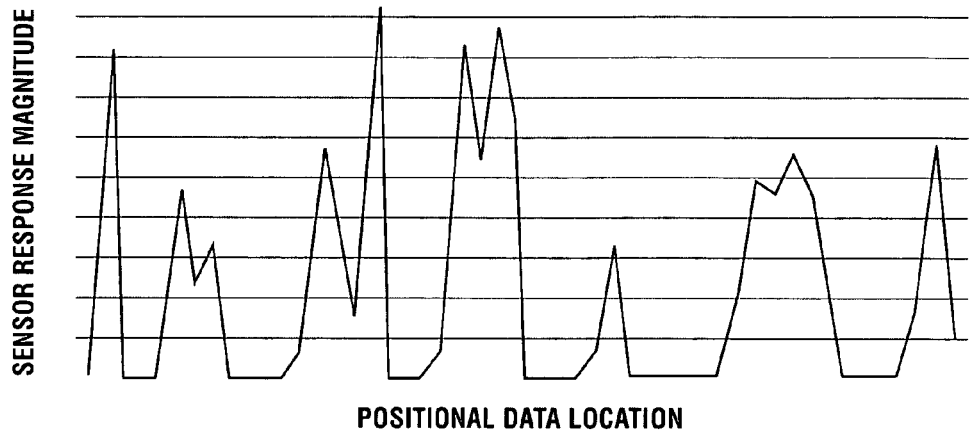
FIG. 7 is a graphical representation of a security signature produced by the scanner shown in FIG. 1.

FIG. 7 shows an exemplary graphical representation of a security signature in which the horizontal axis labeled "positional data location" represents a linear distance along the scanning path 80 (see also FIGS. 4 and 5) and the vertical axis labeled "sensor response magnitude" represents the magnitude of radiation emitted from a substrate 20 having one or more security features 60 applied thereto. As a further example, the vertical axis may represent the optical intensity of visible light emitted by fluorescing fibers 62 (FIG. 3) applied to the substrate 20 along the scanning path 80.

Figure 8:
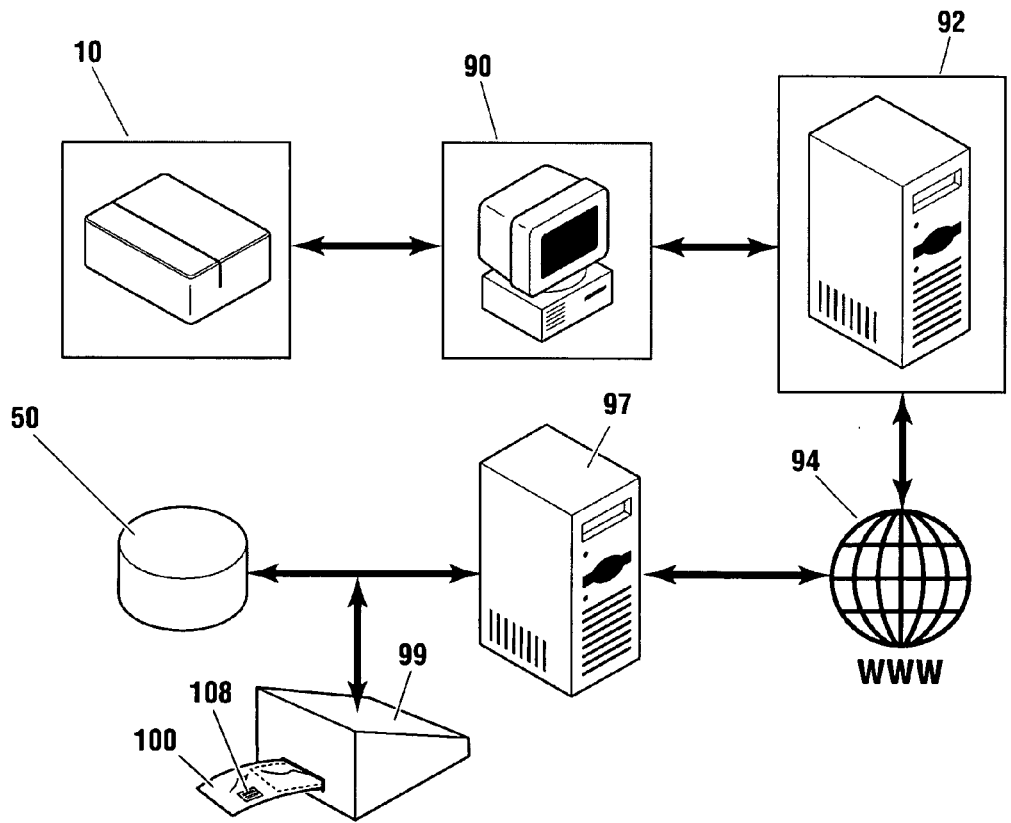
FIG. 8 is a diagram of a system for networked access to associated information in accordance with one embodiment of the invention.

FIG. 8 shows an exemplary system for networked access to the associated information, in accordance with one embodiment of the invention. In the system of FIG. 8, the scanner 10 is operable to scan a given value item 100, produce therefrom a security signature, and transmit the security signature to a personal computer 90 connected to the scanner 10. The personal computer 90 is operable to receive the security signature and transmit the received security signature to a branch local area network server 92, which is operable to receive the security signature and transmit the received security signature via a direct or network link, such as the internet link 94 shown in FIG. 8, to a processing centre 97. The processing centre 97 is operable to receive the security signature and cause a data writer 99 to store the received security signature as a stored profile in the electronic storage medium 108 of the given value item 100. Additionally or alternatively, the security signature may be stored as a stored profile in the external database 50.

Not all of the system components shown in FIG. 8 are necessary for the system of FIG. 8 to be operable. For example, the scanner 10 may have incorporated therein the data writer 99, the external database 50, or both the data writer 99 and the external database 50 such that the scanner 10 itself is operable to store the security signature as a stored profile. By way of further example, the scanner 10 may be connected, directly or via one or more of the communication components of the system of FIG. 8, to the data writer 99, the external database 50, or both the data writer 99 and the external database 50.

Method of Operation

Figure 9:
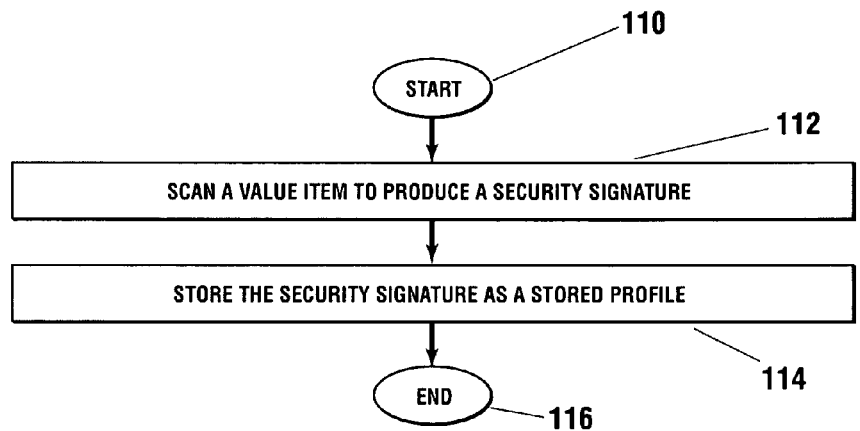
FIG. 9 is a flow diagram of a process of creating a stored profile in accordance with the preferred embodiment of the invention.

In the preferred embodiment and as shown in FIG. 9, the memory circuit 27 (FIG. 6) contains blocks of code for directing the processing circuit 26 (FIG. 6) to perform a process, shown generally at 110, of creating a stored profile. The process of FIG. 9 is typically performed on a given value item 100 before the given value item 100 is issued for general use.

When a given value item 100 is presented at the scanner 10, block 112 directs the processing circuit 26 to cause the scanner 10 to scan the given value item 100, including possibly scanning multiple portions of the substrate 20 multiple times, and to produce a security signature that uniquely identifies the given value item 100.

Block 114 then directs the processing circuit 26 to store the security signature as a stored profile. The processing circuit 26 preferably stores the stored profile in the electronic storage medium 108 of the value item 100. Additionally or alternatively, the processing circuit 26 stores the stored profile in a storage medium external to the value item 100, such as the external database 50 (FIGS. 6 and 8).

Prior to, simultaneously with, or subsequent to executing block 112, the associated information may be stored in the electronic storage medium 108, the external database 50, or both the electronic storage medium 108 and the external database 50. In the preferred embodiment, the associated information is stored in a manner such that access to the associated information is denied without proper use of an access code unique to the associated information and to the given value item 100.

Block 116 directs the processing circuit 26 to end the process 110.

Figure 10:
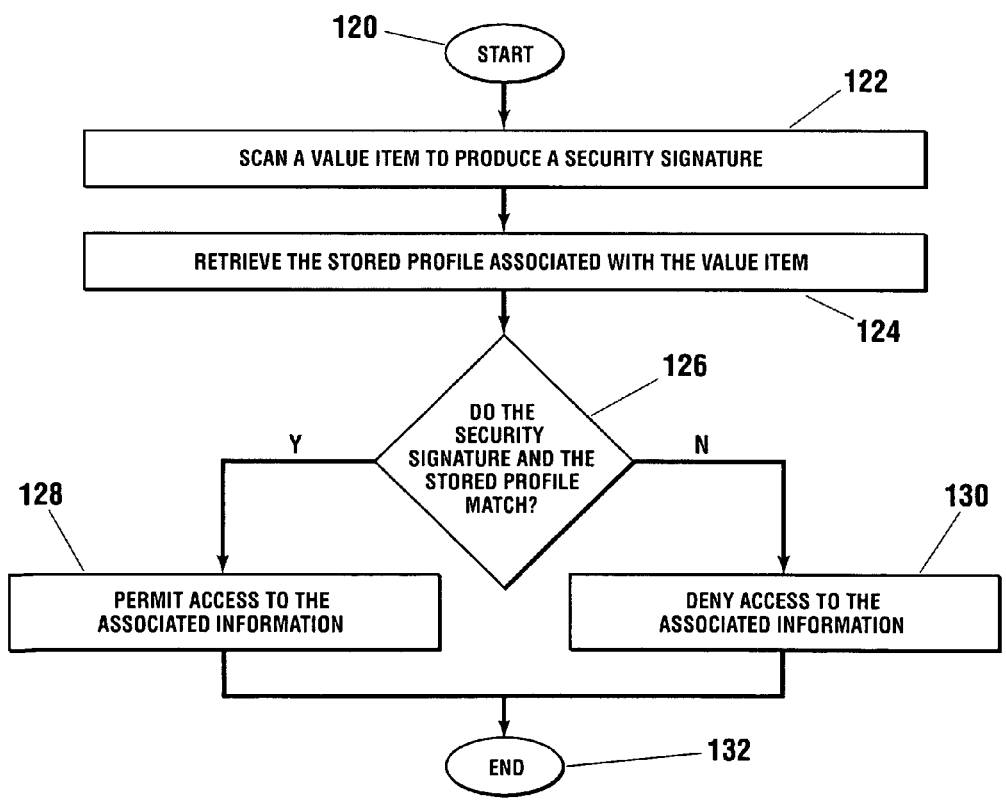
FIG. 10 is a flow diagram of a process of determining whether to permit access to the associated information in accordance with the preferred embodiment of the invention.

In the preferred embodiment and as shown in FIG. 10, the memory circuit 27 (FIG. 6) contains blocks of code for directing the processing circuit 26 (FIG. 6) to perform a process, shown generally at 120, of determining whether to permit access to the associated information. The process of FIG. 10 is illustrative of circumstances in which a given value item 100 has associated with it a stored profile and associated information, and has been issued for general use. The stored profile and the associated information are preferably stored within the electronic storage medium 108, but may alternatively be stored in the external database 50, or in both the electronic storage medium 108 and the external database 50.

When a given value item 100 is presented at the scanner 10, block 122 directs the processing circuit 26 to cause the scanner 10 to scan the given value item 100 and produce a security signature that uniquely identifies the given value item 100.

Block 124, which may be executed before, after or simultaneously with the execution of block 122, directs the processing circuit 26 to retrieve the stored profile associated with the given value item 100, preferably from the electronic storage medium 108 of the given value item 100 or, alternatively, from the external database 50.

After blocks 122 and 124 have been executed, block 126 directs the processing circuit 26 to compare the security signature produced by block 122 and the stored profile retrieved by block 124. The result of such comparison is used by block 126 to determine whether the security signature and the stored profile match each other. In the preferred embodiment, block 126 directs the processing circuit 26 to determine whether the security signature and the stored profile match by determining whether the security signature and the stored profile differ by an extent less than a comparison threshold. The comparison threshold may take into account the possibility of measurement error or other tolerance factors. If the security signature and the stored profile differ by less than the comparison threshold, then block 126 determines that the security signature and the stored profile match. If a match is determined, the process proceeds to block 128. If a match is not determined, the process proceeds to block 130.

Block 128 directs the processing circuit 26 to permit access to the associated information, after which the process proceeds to block 132. Block 128 may direct the processing circuit 26 to permit access to the associated information by generating an access code for accessing the associated information, and making the access code available for use. Preferably, the access code is unique to the associated information and to the given value item 100. Accessing the associated information may include using the access code as a decryption key for decrypting data stored in the electronic storage medium 108, the external database 50 or both the electronic storage medium 108 and the external database 50. Block 128 may also direct the processing circuit 26 to generate one or more output messages confirming the match and/or permission to access the associated information, which may include displaying a user message on a computer terminal (not shown) and generating a report for tracking, logging or other purposes.

Block 130 directs the processing circuit 26 to deny access to the associated information, after which the process proceeds to block 132. Block 130 may direct the processing circuit 26 to deny access to the associated information by not generating a useable access code, or by not generating any access code at all. Block 130 may also direct the processing circuit 26 to generate one or more output messages confirming the lack of a match and/or the denial of permission to access the associated information, which may include displaying a user message on a computer terminal (not shown) and generating a report for tracking, logging or other purposes. Such other purposes may include checking for potential fraudulent use of the given value item 100.

Block 132 directs the processing circuit 26 to end the process 120.

Figure 11:
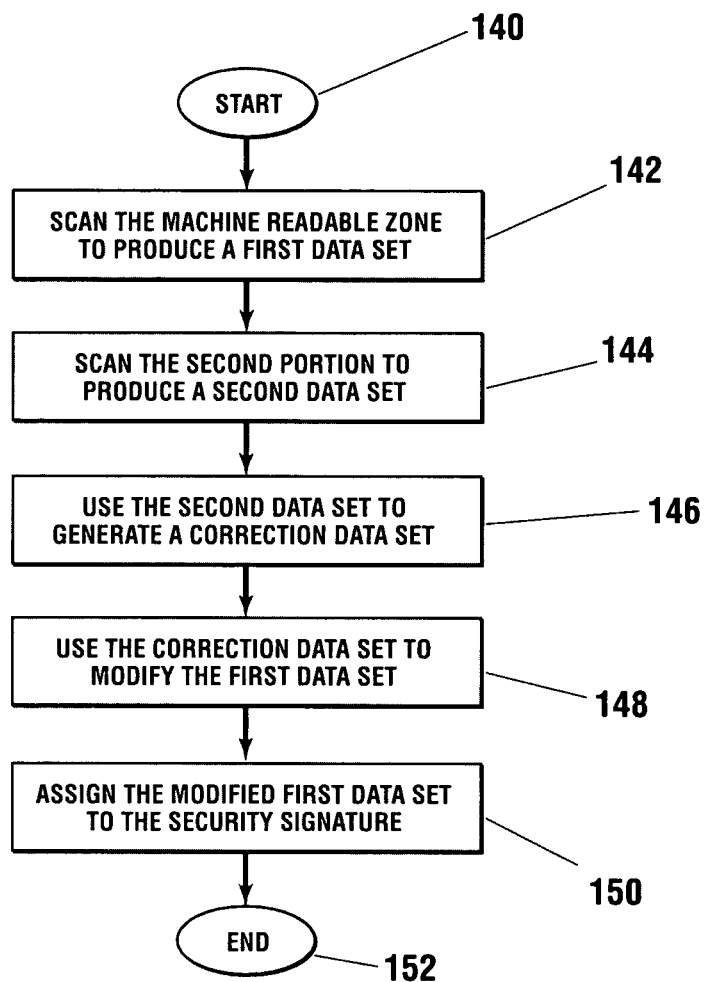
FIG. 11 is a flow diagram of a process of applying correction techniques to the security signature produced by the scanner shown in FIG. 1.

Referring to FIG. 11, in an embodiment of the invention, executing block 122 (shown in FIG. 10) may include applying correction techniques to the security signature in accordance with a process shown generally at 140.

When a given value item 100 is presented at the scanner 10, block 142 directs the processing circuit 26 to cause the scanner 10 to scan the machine readable zone 106 (FIG. 1) of the given value item 100 to produce a first data set. The first data set may represent one or more characteristics of one or more security features 60 located within the machine readable zone 106. The process then proceeds to block 144.

Block 144 directs the processing circuit 26 to cause the scanner 10 to scan the second portion 104 (FIG. 1) of the given value item 100 to produce a second data set. The second data set may represent age-related features of the value item 100 such as color or shading, use-related features of the value item 100 such as the presence of dirt or grease marks, and/or other features of the value item 100. The process then proceeds to block 146.

Block 146 directs the processing circuit 26 to use the second data set to generate a correction data set. The correction data set may include age correction data, use correction data and/or other correction data for the given value item 100 at the particular time of scanning. Generating the correction data set may include comparing the second data set to a pre-determined data set established on the basis of average or typical physical characteristics of a plurality of value items 100 of a type that is similar to the type of the given value item 100. The process then proceeds to block 148.

Block 148 directs the processing circuit 26 to use the correction data set to modify the first data set, thereby producing a modified first data set. Modifying the first data set may include correcting, adapting or otherwise modifying the first data set to take into account aging, use or other factors of the value item 100 determined by block 146. The process then proceeds to block 150.

Block 150 directs the processing circuit 26 to assign the modified first data set to the security signature, which may be considered a corrected security signature.

Block 152 then directs the processing circuit 26 to end the process 140.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of securing access to information associated with a value item, said value item having a substrate, the method comprising:
   (a) scanning said value item with a scanner so as to produce a digital representation of a sensor output of said scanner;
   (b) generating correction data in relation to a pre-determined data set representing average physical characteristics associated with a plurality of value items of a type similar to said value item;
   (c) digitally producing a security signature in response to the digital representation of the sensor output and the correction data, so that the security signature represents one or more characteristics of at least one security feature of said substrate of said value item;
   (d) retrieving a stored profile from an electronic storage medium embedded in said value item, said stored profile having been previously produced to represent said one or more characteristics of said at least one security feature of said substrate of said value item, said at least one security feature having been selected from the group consisting of ink, one or more fibers and one or more planchettes, said one or more characteristics having been selected from the group consisting of a size, location, embedded depth, shade and color of said security feature;
   (e) comparing said security signature and said stored profile; and
   (f) permitting access to said information when said security signature matches said stored profile.

2. The method of claim 1 wherein permitting access to said information when said security signature matches said stored profile comprises making available a decryption key for decrypting said information stored in said electronic storage medium.

3. The method of claim 1 wherein said plurality of value items of a type similar to said value item comprises said value item.

4. The method of claim 1 wherein scanning said value item with a scanner so as to produce a digital representation of a sensor output of said scanner comprises producing, by scanning with said scanner at least a first portion of said value item, a first data set representing said one or more characteristics of said at least one security feature, said first data set identifying said value item; and
   wherein the digitally producing the security signature in response to said digital representation and the correction data in relation to the pre-determined data set representing average physical characteristics associated with a plurality of value items of a type similar to said value item comprises:
     (i) producing, by scanning with said scanner at least a second portion of said value item, a second data set representing age-related features of said value item; and
     (ii) producing said security signature in response to said first data set and said second data set.

5. The method of claim 4 wherein producing said security signature in response to said first data set and said second data set comprises comparing said second data set to said pre-determined data set.

6. The method of claim 1 wherein scanning said value item with a scanner so as to produce a digital representation of a sensor output of said scanner comprises controlling the timing of a scanning operation of said scanner when said scanner is scanning said value item so as to produce said digital representation associated with said security feature, said digital representation identifying said value item, said digital representation comprising a controlled number of data points.

7. The method of claim 6 comprising controlling the timing of operation of a motion control unit of said scanner.

8. The method of claim 6 comprising controlling the timing of a digitization process of said scanner.

9. The method of claim 8 wherein controlling the timing of said digitization process of said scanner comprises controlling said digitization process in response to a scanning speed associated with said value item.

10. The method of claim 9 wherein controlling said digitization process in response to said scanning speed associated with said value item comprises sensing by said scanner a plurality of markings of said value item.

11. The method of claim 6, wherein the generating of the correction data comprises producing a second digital representation representing age-related features of said value item, and wherein producing said security signature comprises producing said security signature in response to said digital representation and said second digital representation.

12. The method of claim 11 wherein producing said security signature in response to said digital representation and said second digital representation comprises comparing said second digital representation to said pre-determined data set.

13. The method of claim 1 wherein scanning said value item with a scanner so as to produce a digital representation of a sensor output of said scanner comprises detecting, by said scanner having a plurality of rows of sources for producing stimuli and a plurality of rows of sensors for sensing electromagnetic radiation, one or more boundaries of said value item; and scanning said value item within said one or more boundaries to produce said digital representation.

14. The method of claim 1 further comprising, before retrieving said stored profile from said electronic storage medium, writing by a data writer said stored profile to said electronic storage medium of said value item.

15. A system for securing access to information associated with a value item, said value item having a substrate, the system comprising:
(a) a first scanner for scanning said value item to produce a security signature identifying said value item, said security signature representing one or more characteristics of at least one security feature of said substrate of said value item, said at least one security feature being selected from the group consisting of ink, one or more fibers and one or more planchettes, said one or more characteristics being selected from the group consisting of a size, location, embedded depth, shade and color of said security feature;
(b) a data writer for writing, to an electronic storage medium embedded in said value item, said security signature as a stored profile; and
(c) a second scanner operable to:
  (i) scan said value item so as to produce a digital representation of a sensor output of said second scanner;
  (ii) generate correction data in relation to a pre-determined data set representing average physical characteristics associated with a plurality of value items of a type similar to said value item;
  (iii) digitally produce a second security signature in response to the digital representation of the sensor output and the correction data, so that the second security signature identifies said value item;
  (iv) retrieve said stored profile from said electronic storage medium; compare said second security signature and said stored profile; and
  (v) permit access to said information when said second security signature matches said stored profile.

16. The method of claim 15 wherein said first scanner comprises said second scanner.

17. A system for securing access to information associated with a value item, said value item having a substrate, the system comprising:
(a) a scanner comprising a scanning sensor, the scanner being structured and arranged for scanning said value item so as to produce a digital representation of an output of said scanning sensor;
(b) a processor operable generate correction data in relation to a pre-determined data set representing average physical characteristics associated with a plurality of value items of a type similar to said value item;
(c) the processor being further operable to digitally produce a security signature in response to the digital representation of the sensor output and the correction data, so that the security signature represents one or more characteristics of at least one security feature of said substrate of said value item;
(d) the processor being further operable to retrieve a stored profile from an electronic storage medium embedded in said value item, said stored profile having been previously produced to represent said one or more characteristics of said at least one security feature of said substrate of said value item, said at least one security feature having been selected from the group consisting of ink, one or more fibers and one or more planchettes, said one or more characteristics having been selected from the group consisting of a size, location, embedded depth, shade and color of said security feature;
(e) the processor being further operable to compare said security signature and said stored profile; and
(f) the processor being further operable to permit access to said information, when said security signature matches said stored profile, by making available a decryption key for decrypting said information stored in said electronic storage medium.

18. The system of claim 17 wherein said electronic storage medium comprises the processor.

19. The system of claim 18 wherein said electronic storage medium is partially embedded in said value item and said processor comprises an integrated circuit with contacts.

20. The system of claim 18 wherein said electronic storage medium is fully embedded in said value item and said processor comprises a contactless integrated circuit.

* * * * *